May 16, 1967 — H. D. BAUMANN — 3,319,468
DIFFERENTIAL PRESSURE TRANSMITTER
Filed Feb. 24, 1965 — 2 Sheets-Sheet 1
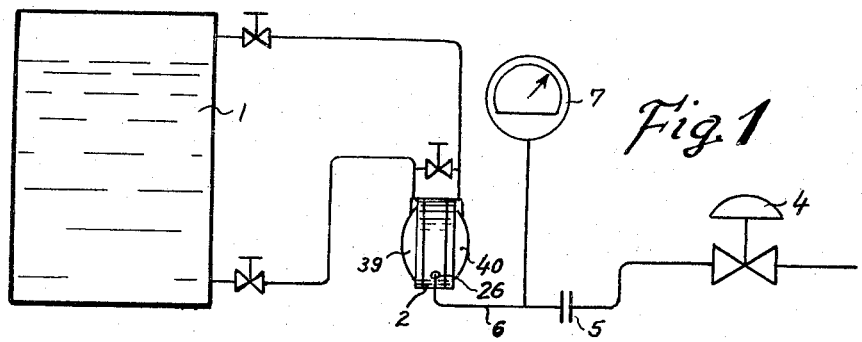
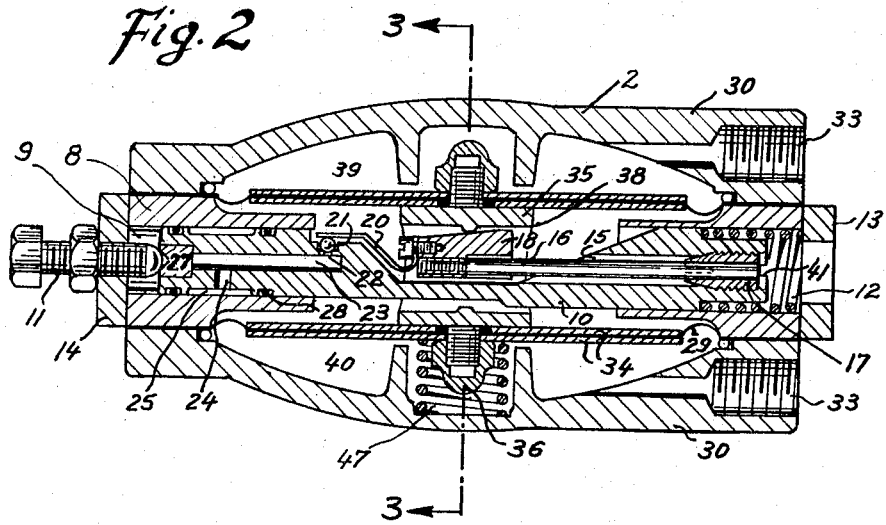
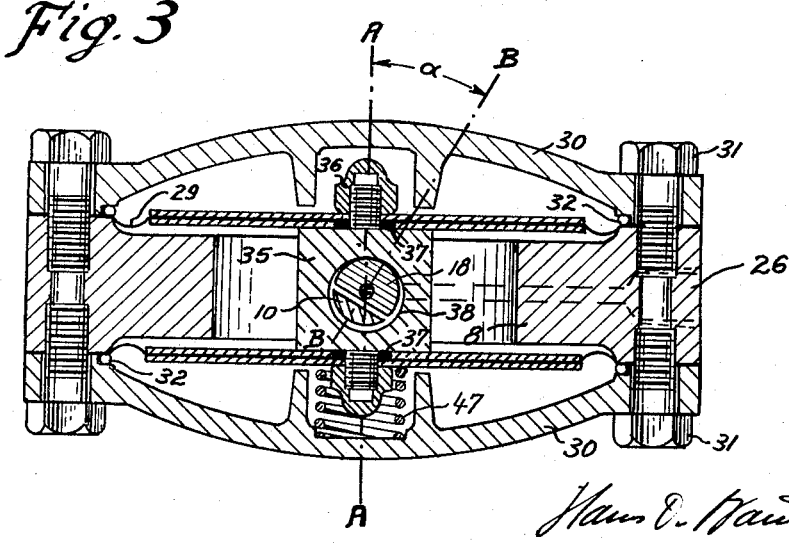
INVENTOR

United States Patent Office 3,319,468
Patented May 16, 1967

3,319,468
DIFFERENTIAL PRESSURE TRANSMITTER
Hans D. Baumann, Decatur, Ill.
(Rte. des Isle, 14 Conde-sur-Noireau, France)
Filed Feb. 24, 1965, Ser. No. 434,794
4 Claims. (Cl. 73—407)

This invention relates to a differential pressure transmitter suitable to measure the difference between two independent and separate static pressures and more particularly, to transmit the measured differential pressure in form of proportional pneumatical or electrical energy to a remote receiving or indicating apparatus.

Applications for such a device are found in power plants where the static head of water pressure in a pressurized vessel provides a difference between the static pressure at the bottom and the one in top of such vessel and thereby is used as an indication of the water level. Other typical applications include measurement of pressure drop across nozzles and orifices to determine the amount of flow passing such devices.

Differential pressure transmitters presently employed perform all these functions quite accurately. However, in their present form of construction these devices are complex and bulky due to the fact that the measuring portion of these transmitters are distinctly separated and removed from the fluid pressurized sensing element itself. This separation is sometimes accomplished by an intermediary fluid such as silicon oil. On the other hand, transmission of resultant motion of the sensing device to the metering portion of such transmitters is accomplished by means of levers which have to be sealed from the process fluid by cumbersome and expensive mechanical devices such as bellows.

The present invention has for an important object the combination of sensing element and metering portion in one compact device. The resultant space and weight savings are especially important for air-borne applications.

Other important objections are the increase of reliability through the elimination of secondary seals, bearings, and linkages. Furthermore, by exchange of a minimum number of parts this device can be converted to transmit an electrical rather than a pneumatic signal.

Yet, another objection is the provision of a differential pressure transmitter which is rugged for a long service life and which is easy and inexpensive to manufacture.

These and other objections and advantages of my invention will best be understood from the following detailed description, when considered in conjunction with the annexed drawings, wherein—

FIG. 1 is a diagrammatical view showing a typical system to which the differential pressure transmitter is applied and illustrating the transmitter, primary air restriction, air supply, indicating gage, and a liquid filled vessel in operative relationship.

FIG. 2 is a vertical, central, cross-sectional view, showing the structure and arrangements of parts of my invention.

FIG. 3 is a transverse section taken on the line 3—3 of FIG. 2.

Figure 4:
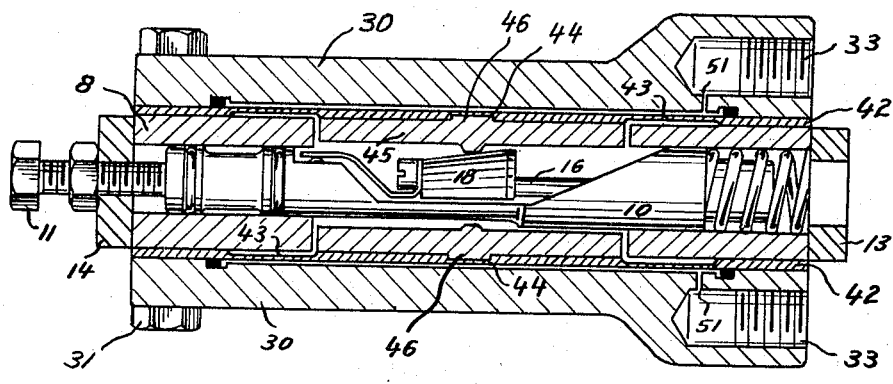
FIG. 4 shows an alternate arrangement of diaphragms in my invention.

Referring now to the drawings in greater detail, pressure from the top of a vessel 1 enters the low-pressure sensing chamber 40 of my invention indicated as 2. A second tube connects the bottom opening of vessel 1 to the high pressure sensing chamber 39. The difference in pressure between the two pressure ports is proportional to the level of the liquid in vessel 1. Air, controlled at a constant pressure by a regulator 4, passes a fixed restriction indicated at 5 and enters the metering element of my invention. As described later in greater detail, decrease in differential pressure causes increased air bleed by this metering portion of my invention. As a result air pressure measured at 6 and indicated by a remote gage 7 will decrease. The rate of decrease can be matched with the spacing on the dial of gage 7, so that a remote observer may have a constant and accurate indication of the level of liquid in vessel 1.

Referring now to FIG. 2, my invention consists of a ring shaped housing 8 having a cross-central bore 9, containing a rod 10. Rod 10 can be moved in its axial direction my means of a set screw 11 and an opposing coiled compression spring 12. Both, set screw 11 and spring 12, are kept in fixed relation to housing 8 by means of retaining members 13 and 14. A coiled compression spring 47 may be used to balance the weight of the moving parts in assembly 2. Rod 10 has an axial bore 15 containing within a round stem 16 suitably fastened to the terminating end of rod 10 by a collet 17. Said stem 16 is in turn threaded into a cone shaped member 18 having a circular segment removed from its cross-section to fit into a contoured void of rod 10. A flexible metal strip 20 fastened to cone 18 cooperatively engages a ball 21 in respect to an integral orifice 22 in rod 10. An air passage 23 closed by plug 27 is providing means of communication between orifice 22, bore 24, a circular channel 25 and ultimately a threaded port 26 in housing 8. Rubber O-ring seals 28 prevent escape of signal air pressure from channel 25.

Housing 8 provides a flanged upper and lower surface to retain thin metal diaphragms 29 between covers 30. The latter are fastened to housing 8 by means of bolts 31. Teflon seals indicated at 32 prevent escape of fluid pressure introduced through threaded ports 33. Diaphragms 29 are retained at their central section between a pair of plates 34 held together by a threaded portion of a yoke 35 and cap nuts 36. Teflon O-rings 37 prevent fluid leakage by this threaded connection. Yoke 35 has a cross-central horizontal bore 38 which is slightly larger in diameter than rod 10, so that said rod can move freely through bore 38. However, movement of rod 10 towards the set screw 11 will produce contact between cone 18 and a portion of the inner circular surface of bore 38 to sense deflection of the diphragm assembly as a result of pressure difference between that in the upper cavity 39 and lower cavity 40 of the assembly 2.

Whenever pressure in cavity 39 is larger than in cavity 40, a certain motion—dependent on the stiffness of diaphragms 29 and stem 16—is sensed by yoke 35, cone 18, flapper 20, and ball 21 leading to a decrease in flow area between ball 21 and orifice 22. This decrease in flow area results in reduced bleeding of air to exhaust and causes a built-up in signal pressure sensed by gage 7, as explained before.

Rotation of shaft assembly 10 by means of a screw driver slot 41 causes a decease in the amount of signal pressure change per given change in differential pressure as a function of cosine α. Referring to FIG. 3, the larger the angle between the polar axis B—B of shaft 10 and the vertical axis A—A of the assembly 2 becomes, the less motion is sensed between ball 21 and orifice 22 for a given deflection of the diaphragm assembly. Rotation of shaft 10 thereby serves to adjust the ratio between air signal and differential pressure change or the "span" of this differential pressure transmitter. Horizontal movement of shaft 10, on the other hand, will change the "set-point" or the amount of differential pressure required to produce a certain initial air signal.

FIG. 4 indicates an alternate arrangement of sensing diaphragms. Instead of the thin diaphragms 29 clamped between plates 34, a single plate 42 each is located on top and below housing 8. This plate has a circular thinned section 43, designed to produce a certain desired flexibility, and a central recess 44. The latter recess serves to center yoke 45 by means of protruding sections 46. The advantage of this type of diaphragm assembly is that it does not require a screwed connection in contact with the fluid to be measured and thereby avoids possible areas of leakage through the diaphragm. Another advantage is that very little space is required between the diaphragm and cover 30, thereby providing a small fluid volume which together with an orifice 51 dampens out fluid pressure pulsations.

Figure 5:
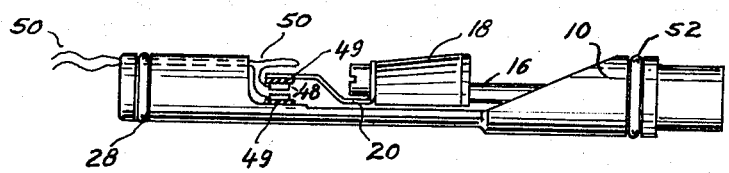
FIG. 5 is a similar device modified to employ an electrical sensing device of the variable capacitance type.

Instead of a pneumatic signal output, my invention may also be used to produce an electric output signal in relation to the sensed differential pressure. Such a modification is shown in FIGURE 5. Here, ball 21 and orifice 22 are replaced by an electrical sensing device of the variable capacitance type. Two metal plates 48 are fastened with suitable insulation 49 to the flexible metal strip 20 and rod 10 respectively, to form a variable capacitor in an oscillating amplifying circuit of established art (not shown), and are connected to the latter by wires 50. An air gap between plates 48 serves as dielectric. Any change in differential pressure causes variations in this air gap and subsequent changes in capacitance. This, in turn, results in proportional current output by the amplifier network used to transmit the indicated differential pressure change to a remote location or to an electrical indicating or recording device. A third O-ring 52 may be added on shaft 10, thereby providing a seal for silicone oil contained between diaphragms 29 for damping purposes or as alternate dielectric.

The invention has been disclosed in connection with specific embodiments of the same, but it will be understood that this is intended by way of illustration only and that numerous changes can be made in the construction and arrangements of parts such as allowing orifice 22 to cooperate directly with metal strip 20 instead of ball 21 without departing from the spirit of the invention or the scope of appended claims.

Having thus clearly shown and described what is claimed to be as new and desired to secure by Letters Patent is:

1. A differential pressure transmitter to measure—and transmit a signal proportional to—fluid pressure therein comprising:
    (a) a housing having a flat upper and lower surface and having an opening centrally of said surfaces, said housing also being provided with a side opening substantially perpendicular therefrom,
    (b) one or more diaphragms disposed between the flat surfaces of the housing and flanges, the latter containing suitable fluid ports, said diaphragms being cooperatively connected and supported by a yoke extending through said central opening of the housing,
    (c) a shaft extending through the perpendicular side opening of the housing and at the same time through a perpendicular opening of said yoke,
    (d) a stem having a flexible portion located in an axially located bore of said shaft and suitably fastened to one terminating end of said shaft,
    (e) a cone secured to the flexible portion of said stem and cooperatively engaged with a semi-circle of said perpendicular opening in said yoke,
    (f) a flexible member mounted on said cone to engage suitable measuring means,
    (g) means to move shaft, stem, and cone in axial direction of said shaft,
    (h) means to rotate shaft, stem, and cone around their polar axis.

2. A differential pressure transmitter essentially described in claim 1 wherein said measuring means consist of
    (a) a ball being cooperatively engaged by said flexible member in relationship to an orifice located in said shaft,
    (b) channels located within said shaft and housing to provide access of metering fluid to said orifice,
    (c) suitable sealing means to prevent escape of fluid from said channels.

3. A differential pressure transmitter essentially described in claim 1 wherein said measuring means consist of
    (a) a metal plate insulated against and fastened to said flexible member and corresponding with
    (b) a second metal plate connected to said shaft essentially in opposite location of the first metal plate,
    (c) electrical wires for connecting each individual metal plate to a suitable electrical amplifying circuit.

4. A differential pressure transmitter essentially as described in claim 1 having one or more coiled compression springs located between said flange and said diaphragms.

References Cited by the Examiner

UNITED STATES PATENTS

| | | | |
|---|---|---|---|
| 2,786,109 | 3/1957 | Esken | 73—407 X |
| 3,052,126 | 9/1962 | Laas | 73—407 |

LOUIS R. PRINCE, *Primary Examiner.*

D. O. WOODIEL, *Assistant Examiner.*